United States Patent
Hoffman et al.

(10) Patent No.: US 12,433,197 B2
(45) Date of Patent: Oct. 7, 2025

(54) HARVESTING MACHINE CUTTER HEAD WITH AUTOMATED POSTURE-BASED REEL FINGER PITCH ADJUSTMENT

(71) Applicant: Deere & Company, Moline, IL (US)

(72) Inventors: Daniel S. Hoffman, Bettendorf, IA (US); Cristiano Engelmann, Horizontina (BR); Anthony J. Knepper, Asbury, IA (US); Justin C. Freehill, Fenton, IL (US); Duane M. Bomleny, Geneseo, IL (US); Corwin M. Puryk, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 1006 days.

(21) Appl. No.: 17/466,047

(22) Filed: Sep. 3, 2021

(65) Prior Publication Data

US 2023/0070185 A1    Mar. 9, 2023

(51) Int. Cl.
*A01D 57/03* (2006.01)
*A01D 41/14* (2006.01)
*A01D 57/04* (2006.01)

(52) U.S. Cl.
CPC ............ *A01D 57/03* (2013.01); *A01D 41/141* (2013.01); *A01D 41/145* (2013.01); *A01D 57/04* (2013.01)

(58) Field of Classification Search
CPC .... A01D 57/03; A01D 41/141; A01D 41/145; A01D 57/02; A01D 57/04
See application file for complete search history.

(56) References Cited

U.S. PATENT DOCUMENTS

| 4,936,082 A | * | 6/1990 | Majkrzak | A01D 57/10 |
| | | | | 56/220 |
| 6,530,202 B1 | * | 3/2003 | Guyer | A01D 57/03 |
| | | | | 56/226 |

(Continued)

FOREIGN PATENT DOCUMENTS

| CA | 2180625 C | 9/2003 |
| CN | 103975694 A | 8/2014 |

(Continued)

OTHER PUBLICATIONS

DE 2411153 A1—English translation (Year: 1975).*

(Continued)

*Primary Examiner* — Joseph M Rocca
*Assistant Examiner* — Julia C Tran
(74) *Attorney, Agent, or Firm* — KLINTWORTH & ROZENBLAT LLP

(57) ABSTRACT

A harvesting machine includes a cutter head having a cutter bar for cutting crop from a ground surface and a rotatable reel located above the cutter bar. Reel arms of the reel each include a plurality of fingers thereon to engage the crop. The cutter head also has an actuator configured to adjust a pitch of the fingers with respect to the reel arms. A controller is operably connected with the cutter head and is configured to receive an input on a cutter head posture relative to the ground surface, with the input on the posture of the cutter head including one or more of a height of the cutter head or an angle of the cutter head relative to the ground surface. The controller operates the actuator to automatically control the pitch of the plurality of fingers based on the received input on the posture of the cutter head.

19 Claims, 4 Drawing Sheets

(56) References Cited

U.S. PATENT DOCUMENTS

| | | | |
|---|---|---|---|
| 8,800,256 B2 | 8/2014 | Swenson | |
| 11,944,035 B2* | 4/2024 | Hunt | A01D 41/145 |
| 2002/0148210 A1* | 10/2002 | Bickel | A01D 57/03 |
| | | | 56/226 |
| 2004/0006958 A1* | 1/2004 | Thiemann | A01D 41/141 |
| | | | 56/10.2 R |
| 2006/0213168 A1* | 9/2006 | Remillard | A01D 57/02 |
| | | | 56/10.2 R |
| 2013/0160420 A1* | 6/2013 | Swenson | A01D 57/02 |
| | | | 56/364 |
| 2014/0041352 A1* | 2/2014 | Johnson | A01D 41/141 |
| | | | 56/10.2 R |
| 2016/0007531 A1* | 1/2016 | Schlipf | A01D 41/14 |
| | | | 56/10.2 E |
| 2017/0049045 A1* | 2/2017 | Wilken | A01D 34/008 |
| 2017/0311546 A1* | 11/2017 | Jost | A01D 34/04 |
| 2018/0332767 A1* | 11/2018 | Muench | A01D 57/04 |
| 2018/0332768 A1* | 11/2018 | Isaac | A01D 41/06 |
| 2019/0037771 A1* | 2/2019 | Walker | A01D 57/06 |
| 2019/0327892 A1* | 10/2019 | Fries | A01D 57/03 |
| 2020/0214208 A1* | 7/2020 | Shearer | A01D 57/02 |
| 2020/0275609 A1* | 9/2020 | Drzal | A01D 57/03 |
| 2023/0157208 A1* | 5/2023 | Farley | A01D 41/141 |
| | | | 56/257 |

FOREIGN PATENT DOCUMENTS

| | | | |
|---|---|---|---|
| DE | 2411153 A1 * | 9/1975 | |
| EP | 1297735 B1 | 11/2005 | |
| EP | 3560314 A1 | 10/2019 | |
| EP | 3662739 A1 | 10/2020 | |
| GB | 1194671 A | 6/1970 | |
| JP | S63173517 A * | 7/1988 | |

OTHER PUBLICATIONS

JPS63173517A _-_ English_translation (Year: 1988).*
BISO VX Crop Ranger Trendline Light | BISO navigator, http://navigator.biso.eu/en/en-biso/harvesting-technics/biso-vx-crop-ranger-trendline-light/, Apr. 20, 2020.

* cited by examiner

HARVESTING MACHINE CUTTER HEAD WITH AUTOMATED POSTURE-BASED REEL FINGER PITCH ADJUSTMENT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to embodiments of harvesting machine cutter heads that include a reel with fingers thereon whose pitch may be automatically adjusted based on a posture of the cutter head.

BACKGROUND OF THE DISCLOSURE

Agricultural harvesting machines are designed to harvest crops. They have headers that cut crops from the ground, which are then processed in the body of the harvesting machine. A typical header of a combine for harvesting small grain like wheat or barley is a so-called cutter head, which comprises a cutter bar, a reel, and a transverse conveyor. The cutter bar cuts the stalks of the crop from the roots remaining in the ground, and the transverse conveyor, which can be an auger or a belt conveyor, feeds the crop transversely to the feederhouse, which on its end feeds it into the interior of the combine harvester for threshing and further processing. The reel is located above the cutter bar and rotates to engage reel fingers into the crop to feed the crop rearwardly such that it can be cut by the cutter bar. The cut crop is conveyed to the rear by at least one of the reel fingers until it is engaged by the transverse conveyor.

SUMMARY OF THE DISCLOSURE

A harvesting machine is disclosed that includes a cutter head having a cutter bar for cutting crop from a ground surface and a reel located above the cutter bar and being rotatable about an axis of rotation, the reel comprising a plurality of reel arms each having a plurality of fingers thereon to engage the crop. The cutter head also has an actuator configured to adjust a pitch of the plurality of fingers with respect to the reel arms. A controller of the harvesting machine is operably connected with the cutter head. The controller is configured to receive an input on a posture of the cutter head relative to the ground surface, with the input on the posture of the cutter head including one or more of a height of the cutter head off the ground surface or an angle of the cutter head relative to the ground surface. The controller is also configured to operate the actuator to automatically control the pitch of the plurality of fingers based on the received input on the posture of the cutter head.

A control system for controlling pitch of a plurality of reel fingers in a cutter head of a harvesting machine is also disclosed, where the cutter head includes a cutter bar for cutting crop and a reel for engaging the crop and transporting it rearward, the reel comprising a plurality of reel arms on which the plurality of reel fingers are located. The control system includes an actuator operably connected to the reel to adjust a pitch of the plurality of reel fingers relative to a ground surface and a controller operably connected to the actuator. The controller is configured to receive an input on a posture of the cutter head relative to the ground surface, the input on the posture of the cutter head including one or more of a height of the cutter head off the ground surface and an angle of the cutter head relative to the ground surface. The controller is also configured to operate the actuator to automatically control the pitch of the plurality of reel fingers based on the received input on the posture of the cutter head. The actuator is operated to rotate the plurality of reel fingers toward a more horizontal orientation as the cutter head moves closer to the ground surface and toward a more vertical orientation as the cutter head moves further from the ground surface, and is operated to rotate the plurality of reel fingers toward the more horizontal orientation as the cutter head tilts forward toward the ground surface and toward a more vertical orientation as the cutter head tilts backward away from the ground surface.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
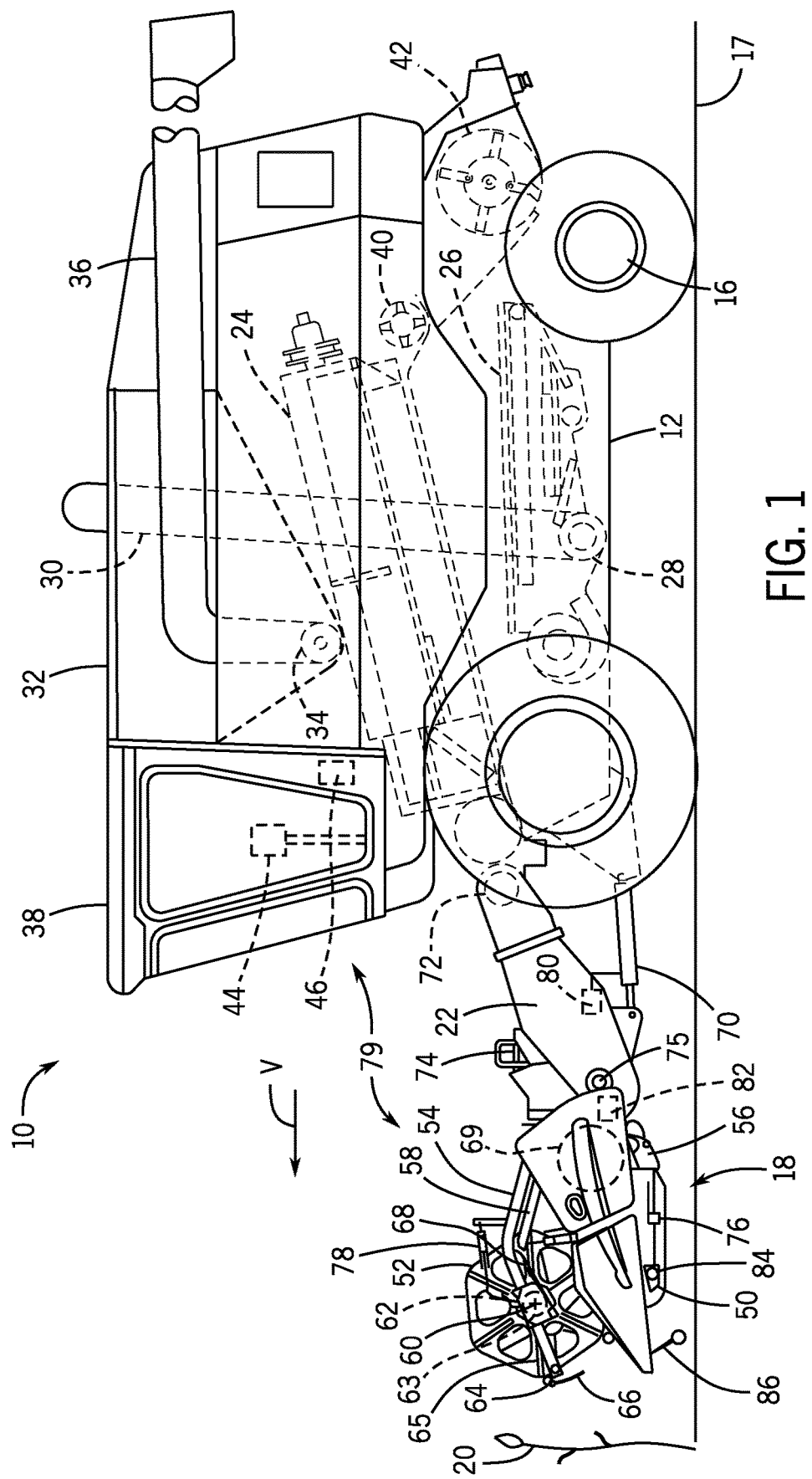
FIG. 1 is a schematic side view of an agricultural harvesting machine that incorporates elements of the present disclosure, in accordance with an example embodiment.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As noted above, cutter heads are commonly utilized within harvesting machines to cut crop from a ground surface and convey cut crop to a rear discharge opening, with the crop then being fed into the interior of the harvesting machine for threshing and further processing. In operation, a number of operating parameters of the harvesting machine are not firmly set, but rather are adjustable in order to allow them to be matched to the crop type and the relevant harvesting conditions. Besides the propulsive speed of the harvesting machine, a number of cutter head parameters may be adjusted, examples of which include the cutting height of the cutter head, the cutter head table length (i.e., the distance between the cutter bar and the transverse conveyor in a length-variable cutter head), and the rotary speed and vertical and horizontal position of the reel.

Another adjustable parameter of the cutter head is the orientation of the reel tines or fingers that are included on the reel. That is, the reel is structured to include a plurality of reel arms extending in a transverse direction relative to movement of the machine, with the reel arms rotating about a central axis. Each of the reel arms includes a plurality of reel fingers thereon that engage into the crop as the reel rotates, to feed the crop rearwardly such that it can be cut by the cutter bar. The reel fingers are rotatable relative to their respective reel arm to adjust the orientation thereof, with the orientation of the reel fingers being adjusted based on crop type and conditions. For example, the reel fingers may be more vertically oriented for a standing crop vs. more horizontally oriented for a downed crop.

Adjustment of the reel finger orientation has previously been performed either manually or in a semi- or fully automated fashion. When adjusted manually, the reel finger orientation is adjusted via a mechanical adjustment of a lever mounted on the reel. With such manual adjustment, the orientation of the reel fingers cannot be performed during the harvesting process (i.e., while the harvesting machine is in motion and harvesting crop) and only with great expenditure of time, even if the conditions during the harvest on a field would change. When adjusted in a semi- or fully automated manner, the reel finger orientation is adjusted via an assembly or actuator (e.g., a bobbin finger angle adjustment ring which is adjustable by an actuator) to adjust the angle of the reel fingers. The adjustment is made by an operator in the cab of the harvesting machine or automatically based on the forward speed of the combine, the speed of the reel, or the position of the reel.

In view of the above, it is recognized that existing systems for adjusting reel finger orientation, including semi- or fully automated adjustments, may be inefficient and/or fail to account for all relevant parameters that impact optimum cutting and pickup of crop by the harvesting machine. For example, an operator may desire to adjust the height and angle at which the cutter bar is set based on crop type, crop condition, or crop volume, in order to provide an optimum cut for the crop and provide a desired amount of crop for harvesting. The reel finger orientation should ideally be correlated with the cutter bar height and angle to provide for proper engagement of the fingers with the crop and prepare the crop for cutting.

A harvesting machine is therefore provided that automatically adjusts orientation of the reel fingers based on a posture of the cutter head, which is understood hereafter to refer to one or more of the height of the cutter head off the ground surface or the angle of the cutter head relative to the ground surface. An actuator is provided in the cutter head that is configured to adjust a pitch of the plurality of fingers with respect to the reel arms, with the actuator in operable communication with a controller of the harvesting machine. The controller is configured to receive an input on the posture of the cutter head relative to the ground surface and operate the actuator to automatically control the pitch of the plurality of fingers based on the received input on the posture of the cutter head. The harvesting machine may therefore be operated in a manner that serves to provide an optimum cut for the crop and provide a desired amount of crop for harvesting, with the reel finger orientation correlated with the cutter head height and angle to provide for proper engagement of the fingers with the crop and prepare the crop for cutting.

According to an embodiment, the controller operates the actuator to rotate the plurality of fingers toward a more horizontal orientation as the cutter head moves more proximate to the ground surface and rotate the plurality of fingers toward a more vertical orientation as the cutter head moves more distal from the ground surface. The controller further operates the actuator to rotate the plurality of fingers toward a more horizontal orientation as the cutter head tilts forward toward the ground surface and rotate the plurality of fingers toward a more vertical orientation as the cutter head tilts backward toward a more level orientation or away from the ground surface. In rotating the plurality of fingers toward a more horizontal orientation, the actuator rotates the plurality of fingers in a counterclockwise direction, so that the plurality of fingers point in a more rearward facing direction relative to a direction of travel of the harvesting machine.

In one implementation, the height of the cutter head off the ground surface and/or the angle of the cutter head relative to the ground surface may be determined via sensor readings provided to the controller. Sensor readings may be acquired on at least one of a feederhouse position and angle relative to the ground surface, a cutter bar position and angle relative to the ground surface, or a faceplate position and angle relative to the ground surface, with the readings used to determine the cutter head posture. The sensed cutter head posture is then used to automatically adjust the pitch of the reel fingers to a desired angle.

In another implementation, an operator input may be provided to the controller to set the cutter head at an indicated cutter head height and cutter head angle. The operator input may be in the form of a quick command corresponding to one of a number of pre-defined operating set-points of the cutter head each having a pre-defined height of the cutter head off the ground surface and a pre-defined angle of the cutter head relative to the ground surface. The number of pre-defined operating set-points selectable via the quick command may include a non-cutting operating set-point, a standing crop cutting operating set-point, and a flat crop cutting operating set-point, with the pitch of the plurality of fingers moving sequentially more toward a horizontal orientation for the flat crop cutting operating set-point, as compared to the standing crop cutting operating set-point, and as compared to the non-cutting operating set-point. The pitch of the reel fingers may be automatically adjusted to a desired angle that corresponds to the selected operational set-point and the cutter head posture associated therewith.

In one embodiment, the controller may also receive override instructions from an operator. Responsive to the receipt of override instructions from the operator, the controller may cause the actuator to further adjust the pitch of the plurality of reel fingers from an initial automatically set pitch thereof.

An embodiment of a harvesting machine containing a cutter head will now be described in conjunction with FIGS. 1-4. In the following example, the wiring harness is principally described as utilized within a specific type of cutter head, which is deployed onboard a specific type of harvesting machine (a combine harvester). In further embodiments, however, the below-described reel finger pitch adjustment can be integrated into other types of cutter heads and harvesting machines. Accordingly, the following description should be understood as merely establishing a non-limiting context in which embodiments of the present disclosure may be better understood.

Example Embodiments of a Harvesting Machine Cutter Head with Automated Posture-Based Reel Finger Pitch Adjustment FIG. 1 shows a self-propelled harvesting machine 10 in the form of a combine, having a supporting chassis 12 that is supported on driven front wheels 14 and steerable rear wheels 16 on the ground 17 and moved forward by the wheels 14, 16. The wheels 14, 16 are rotated by a drive means (not shown) to move the harvesting machine 10 over a crop field to be harvested. In the following, direction references, like forward or rear, refer to the forward direction V of the harvesting machine 10, which is directed towards the left in FIG. 1.

On the forward end area of the harvesting machine 10, a harvesting header in the form of a cutter head 18 is releasably mounted to harvest standing crop 20 in the form of grain or other threshable stalk fruit from the field and to convey it upwardly and rearwardly through a feederhouse assembly 22 to an axial threshing assembly 24 during the harvest operation. The mixture of grain and other material that penetrates through threshing drums and separation grates of the axial threshing assembly 24 reaches a cleaning device 26. Grain cleaned by the cleaning device 26 is conveyed by a grain auger 28 to a grain elevator 30, which feeds it into a grain tank 32. The clean grain in the grain tank 32 can be unloaded by an unloading system comprising a transverse auger 34 and an unloader conveyor 36 arranged as an auger assembly. The crop residues expelled by the axial threshing assembly 24 are fed via a transport drum 40 to a straw chopper 42, which chops and distributes it over the field over the width of the cutter head. The shown axial threshing assembly 24, with one or more axial threshing and separating rotors, is merely an exemplary embodiment and could be replaced by a tangential threshing arrangement with one or more threshing drums and subsequent straw walkers or separation rotors.

The mentioned systems are driven by an internal combustion engine (not shown) and are controlled by a control system from an operator's cab 38. That is, the mentioned systems, along with additional actuators, sensors, and devices within (or outside of) the harvesting machine 10 to be described hereafter, are controlled by means of an controller 46. The controller 46 may control the various systems, actuators, sensors, and devices based upon inputs thereto from a user input device 44 and/or various sensors included in the harvesting machine 10 that measure operating parameters of the machine during operation, with an example input device 44 and sensors to be described in further detail below. The electronic control 46 therefore provides for both operator control of systems in the harvesting machine 10 and automatic control of systems in the harvesting machine 10, or a combination thereof.

Generally, the controller 46 may be configured as a computing device with associated processor devices 46a and memory architectures 46b (FIG. 3), as a hard-wired computing circuit (or circuits), as a programmable circuit, as a hydraulic, electrical, or electro-hydraulic controller, or otherwise. As such, the controller 46 may be configured to execute various computational and control functionality with respect to the harvesting machine 10. In some embodiments, the controller 46 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 46 may be in electronic, hydraulic, mechanical, or other communication with various systems or devices of the harvesting machine 10 via wireless or hydraulic communication means, or otherwise. An example location for the controller 46 within the operator cab 38 is depicted in FIG. 1; however, it is understood that other locations on the harvesting machine 10 are possible.

Figure 2:
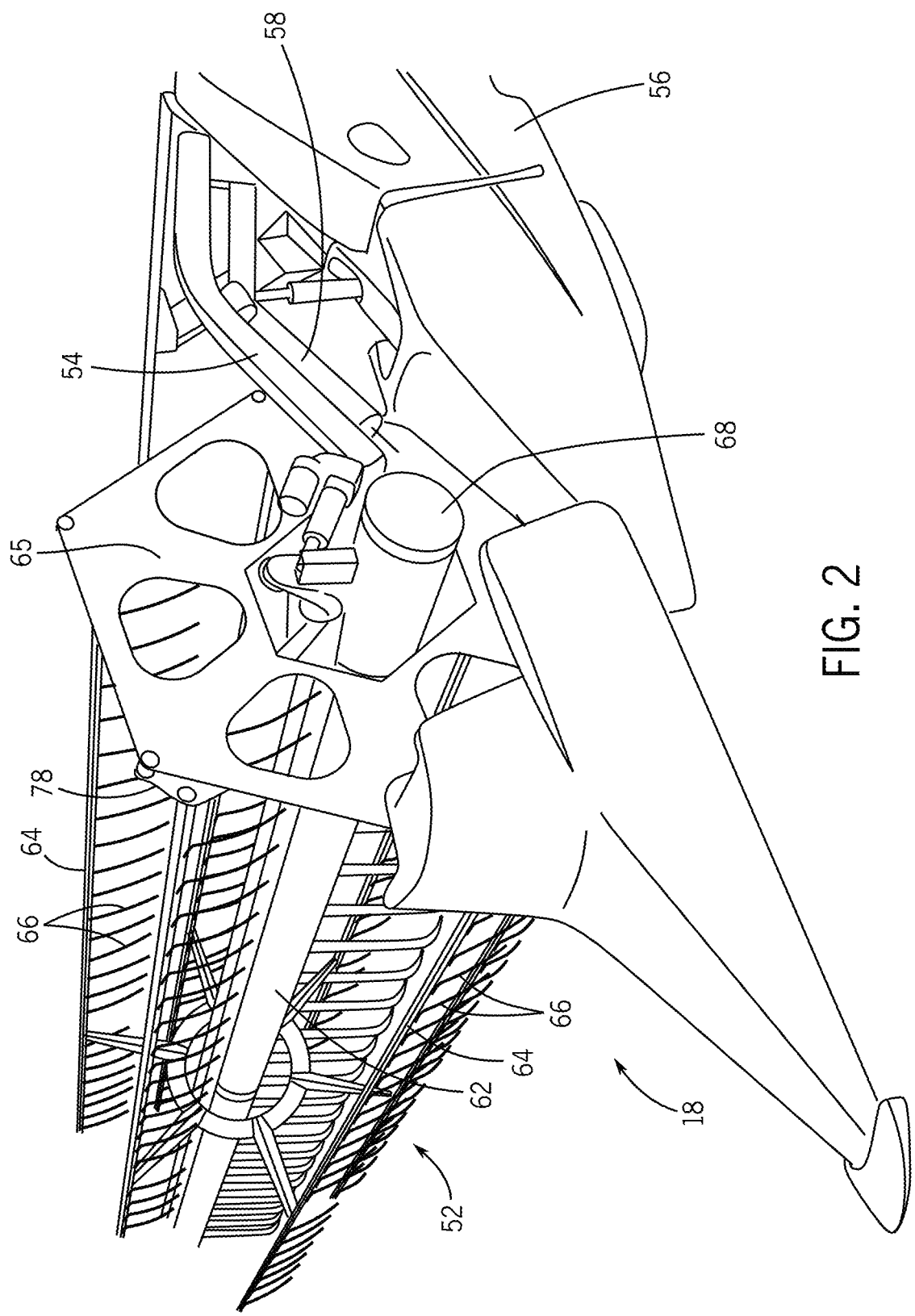
FIG. 2 is a perspective view of a cutter head included in the harvesting machine of FIG. 1, in accordance with an example embodiment.

As shown in FIG. 1 and now also in FIG. 2, the cutter head 18 comprises a reciprocating cutter bar 50 extending generally over the entire width of the cutter head 18. The cutter bar 50 can be rigid or flexible, as known in the art. A reel 52 is positioned on the cutter head 18 and extends generally over the entire width of the cutter head 18 (or a part thereof). While a single reel 52 is shown and described here as extending over the entire width of the cutter head 18, it is recognized that an alternate construction could include a plurality of reels 52 disposed side by side. The outer ends of the reel 52 are supported on support arms 54. The support arms 54 have rear ends which are supported around axes extending transversely to the forward direction "V" on a frame 56 of the cutter head 18, which frame 56 also extends over the width of the cutter head 18 and extends from there towards the front. Each support arm 54 is coupled to an actuator 58 in form of a hydraulic cylinder, which is pivotally supported on the frame 56 and on the support arm 54. The support arms 54, and thus the reel 52, are lifted and lowered by adjusting (retracting and extending) the actuator 58.

As part of the reel 52, a central tube 62 can be set into rotational motion (during harvest operation, in the counterclockwise direction about a rotational axis 60 in FIG. 1) by a controllable drive 63. Reel arms 65 extend radially to the tube 62 and extend over the width of the cutter head 18, with each reel arm 65 having thereon finger carriers 64 on which reel fingers 66 are mounted. A reel actuator 68 in the form of a hydraulic cylinder is adapted for a horizontal adjustment of the reel 52 by moving a support bearing of the tube along the support arm 54. The cutter head 18 also comprises a transverse conveyor 69, which can be arranged as an auger (as shown) or conveyor belts, in order to feed the crop cut by the cutter bar 50 to the center of the cutter head 18 and to feed it into the feederhouse assembly 22 through a rear opening in the frame 56.

The height of the cutter head 18 over the ground is defined by a head height actuator 70, which pivots the feederhouse assembly 22 and thus the cutter head 18, which is removably mounted thereon, around a horizontal axis 72 extending transversely to the forward direction with respect to the chassis 12 of the harvesting machine 10. The head height actuator 70 is controlled by means of the controller 46 based upon input from the user input device 44 and/or an automatic control, with the controller 46 adapting the platform height to the ground contour, keeping the cutter head 18 at the desired height over ground, or guiding it with a desired pressure on the ground. As known in the art, the cutter head 18 can pivot around a horizontal, forwardly extending axis (lateral tilt) to follow the ground contour and can also be controlled by the controller 46 and an associated actuator. Additionally, a head tilt actuator 74 can control the tilt or angle of the cutter head 18 about a transverse axis 75 relative to the feederhouse assembly 22.

In addition to controlling the height and tilt of the cutter head 18, the length of the cutter head 18 can be also controlled by an actuator 76. That is, the horizontal position of the cutter bar 50 relative to the frame 56 of the cutter head 18 is adjustable via the actuator 76, with the actuator 76 being controlled via the controller 46.

Referring again to the reel 52, the reel finger carriers 64 (and thus the reel fingers 66) are rotatably mounted relative to the reel arms 65, which enables the reel fingers 66 to be kept in a desired orientation, with the orientation or pitch of the reel fingers 66 being variable between an approximately vertical orientation and an approximately horizontal orientation where the reel fingers point in a rearward facing direction relative to a direction of travel V of the harvesting machine 10. The pitch of the reel finger carriers 64 may be controlled relative to the reel arms 65 in dependence on the rotary position of the reel arms 65 around the axis of rotation of the tube 62, as well as the posture of the cutter head 18. The pitch of the reel finger carriers 64 can be changed via a finger actuator 78, with the finger actuator 78 varying the angle of the reel finger carriers 64 around the reel arms 65. The finger actuator 78 can be electric, hydraulic, or pneumatic, according to embodiments, and is controlled via the controller 46.

Figure 3A:
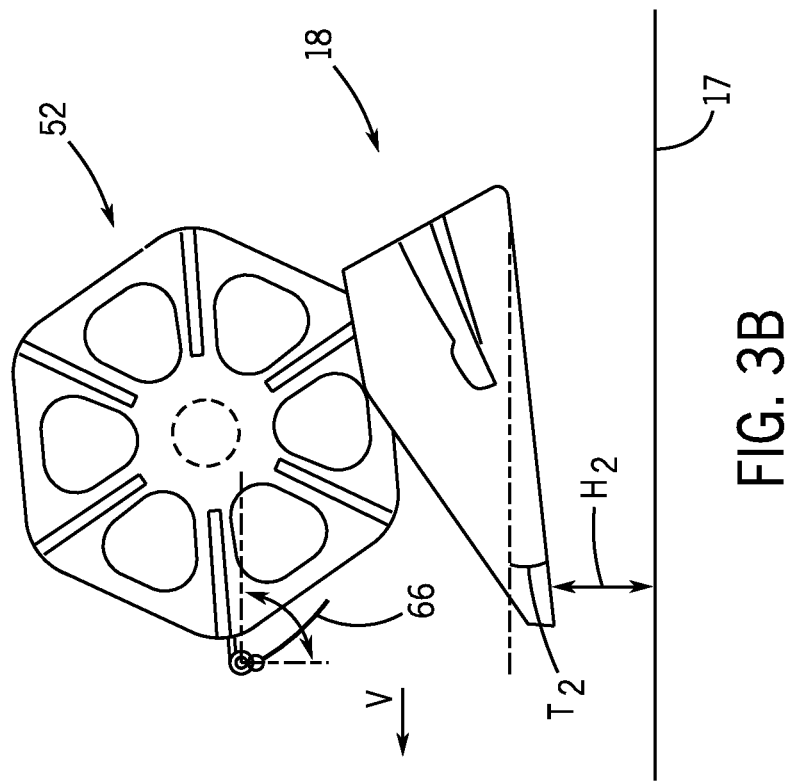
FIG. 3A illustrates reel fingers in the cutter head at a nearly vertical, less aggressive pitch position.
Figure 3B:
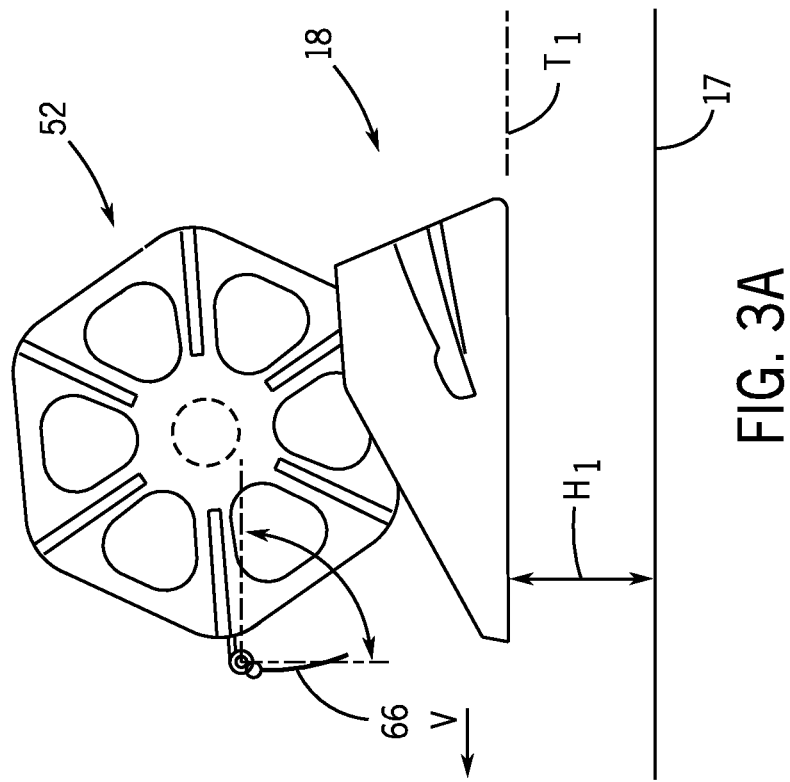
FIG. 3B illustrates reel fingers in the cutter head at a nearly horizontal, more aggressive pitch position.

FIGS. 3A and 3B provide illustrative pitches to which the reel fingers 66 may be rotated. As shown in FIG. 3A, the reel fingers 66 may be positioned in a nearly vertical orientation or pitch, which is understood to provide a position where the fingers do not engage with the crops aggressively in a pick-up and lift type motion (i.e., a "less aggressive" position). As shown in FIG. 3B, the reel fingers 66 may be positioned in a nearly horizontal orientation or pitch, which is understood to provide a position where the fingers act to engage with the crops aggressively in a pick-up and lift type motion (i.e., a "more aggressive" position). When rotating from the less aggressive position of FIG. 3A to the more aggressive position of FIG. 3B, the reel fingers will rotate in a counterclockwise direction, so that the reel fingers 66 point in a more rearward facing direction relative to a direction of travel V of the harvesting machine 10.

Referring again to FIG. 1, according to embodiments, the pitch of the reel fingers 66 is automatically controlled by the controller 46 as a function of the posture of the cutter head 18. That is, the controller 46 is configured to control the finger actuator 78 to set or adjust the pitch of the reel fingers 66 based on a determined posture of the cutter head 18, with it understood that the posture of the cutter head 18 takes into consideration one or more of the height of the cutter head 18 above the ground and the tilt of the cutter head 18 relative to the ground. Responsive to input(s) received thereby regarding the posture of the cutter head 18 relative to the ground surface, the controller 46 operates the finger actuator 78 to automatically control the pitch of the reel fingers 66 based on the received input on the posture of the cutter head 18—with the pitch of the reel fingers 66 adjusted to an angle appropriate for the current posture of the cutter head 18 to provide for proper engagement of the fingers with the crop and prepare the crop for cutting. That is, the controller 46 may operate the finger actuator 78 to rotate the reel fingers 66 toward a more horizontal orientation as the cutter head 18 moves more proximate to the ground surface and rotate the reel fingers 66 toward a more vertical orientation as the cutter head 18 moves more distal from the ground surface. The controller 46 may similarly operate the finger actuator 78 to rotate the reel fingers 66 toward a more horizontal orientation as the cutter head 18 tilts forward toward the ground surface and rotate the reel fingers 66 toward a more vertical orientation as the cutter head 18 tilts backward toward a more level orientation or away from the ground surface. In rotating the reel fingers 66 toward a more horizontal orientation, the finger actuator 78 rotates the reel fingers 66 in a counterclockwise direction, so that the reel fingers 66 point in a more rearward facing direction relative to a direction of travel V of the harvesting machine 10. Accordingly, the controller 46 and actuator provide a control system 79 (along with input device 44 and relevant sensors) by which the pitch of the reel fingers 66 may be automatically adjusted during operation of the harvesting machine 10 based on the posture of the cutter head 18.

The pitch control of the reel fingers 66 as a function of the cutter head posture is best illustrated in FIGS. 3A and 3B. As shown therein, reel fingers 66 may be positioned in a nearly vertical orientation or pitch with the cutter head 18 at a first height H1 above the ground 17 and at a first tilt angle T1 essentially parallel with the ground 17, with this being a less aggressive position for harvesting crop. Reel fingers 66 may then be rotated to a nearly horizontal orientation or pitch when the cutter head 18 moves to a second height H2 that is closer to the ground 17 and to a second tilt angle T2 that is tilted toward the ground 17, with this being a more aggressive position for harvesting crop.

In one implementation, the posture of the cutter head 18 above the ground is determined by the controller 46 responsive to inputs received thereby from an arrangement of one or more sensors 80, 82, 84, 86 provided on the harvesting machine 10. Additionally, a sensor 88 may provide inputs to the controller 46 on the current pitch of the reel fingers 66. The readings acquired by the sensors 80, 82, 84, 86, 88 may be input to the controller 46 during ongoing operation of the harvesting machine 10 to detect changes in position of the cutter head 18 and reel fingers 66. According to embodiments, in sensing the posture (height and/or angle) of the cutter head 18, the sensors 80, 82, 84, 86 may detect the position of actuators 70, 74 in the harvesting machine directly (i.e., be arranged as optical or magnetic sensors which interact with the rod (or other actuating mechanism) of the actuators 70, 74), or may sense the translational or rotational position of an element moved by the actuators 70, 74. As one example, sensor 80 may provide inputs to the controller 46 on the position of head height actuator 70 or on the height of the feederhouse assembly 22 (with a correlated height of the cutter head 18) above the ground surface, i.e., act as a gap sensor to determine the position of the feederhouse assembly 22 relative to ground. As another example, sensor 82 may provide inputs to the controller 46 on the position of the head tilt actuator 74 or on the angle/tilt of the frame 56 of the cutter head 18 relative to the ground surface, i.e., act as an angle/level sensor to determine the tilt of the frame 56 relative to ground. As still another example, sensor 84 may provide inputs to the controller 46 on the height and angle/tilt of the cutter bar 50 relative to the ground surface. As yet another example, sensor 86 may be provided as an optical feeler sensor that is configured to determine a gap between the cutter head 18 and the ground to determine the height of the cutter head 18 there above.

Figure 4:
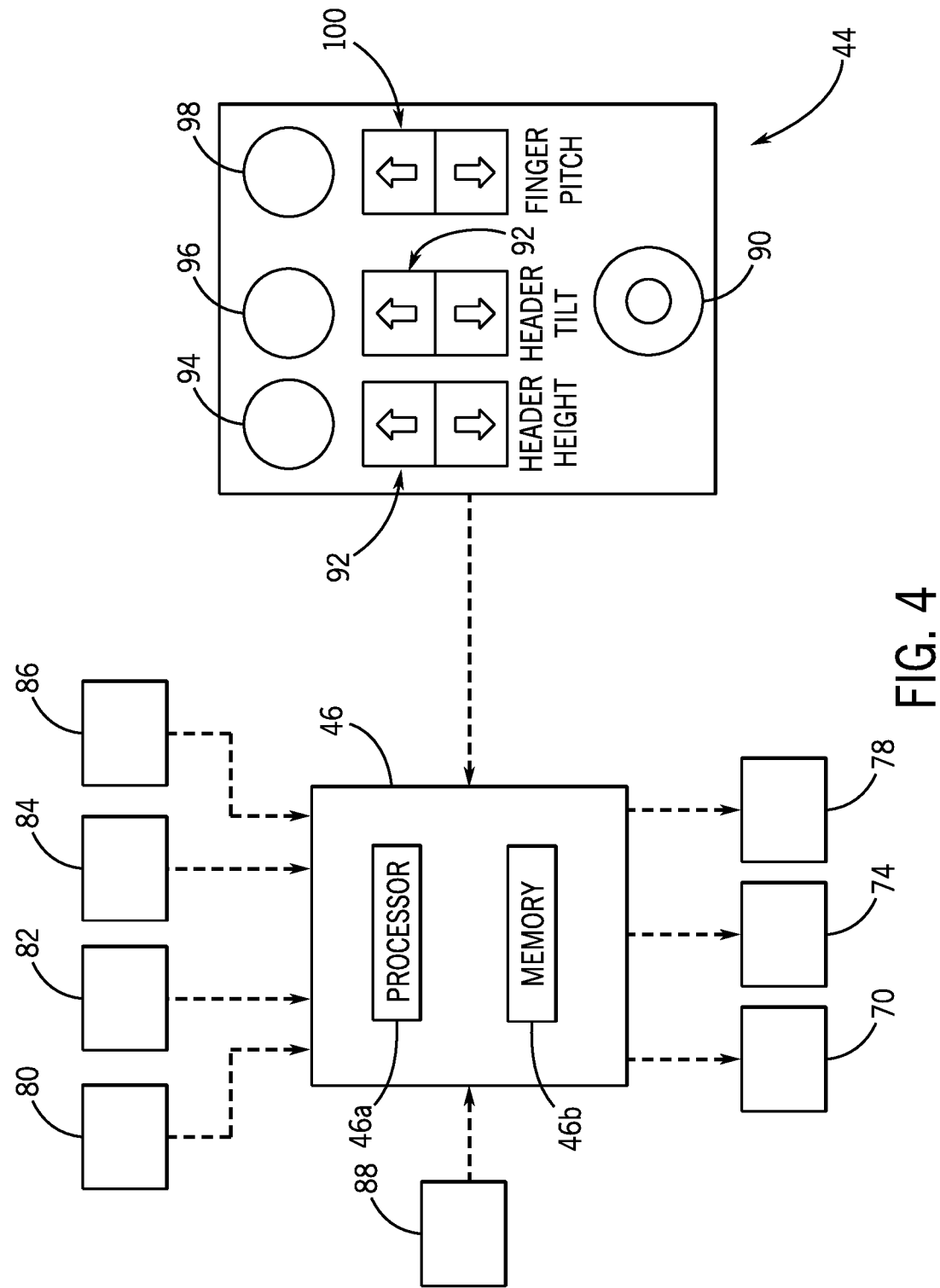
FIG. 4 is a block diagram of a controller and input device with associated sensors and actuators included in the harvesting machine of FIG. 1 and that operates to adjust a pitch or reel fingers in the cutter head, in accordance with an example embodiment.

As shown schematically in FIG. 4, inputs from the various sensors 80, 82, 84, 86, 88—some or all of which may be measured and provided, according to embodiments—are provided to the controller 46. The processor 46a of the controller 46 analyzes the sensor inputs to determine the posture of the cutter head 18 relative to the ground. The processor 46a may then access the memory 46b to identify an optimal pitch for the reel fingers 66 (i.e., that provides for desired engagement of the fingers 66 with the crop to prepare the crop for cutting) that corresponds to the current cutter head posture. Upon identifying the optimal pitch for the reel fingers 66, the processor 46a may generate command signals for the finger actuator 78 that contain commands that cause the finger actuator 78 to rotate the reel fingers 66 to the identified pitch. As previously indicated, the reel fingers 66 will be rotated toward a more horizontal orientation (i.e., "more aggressive" position) as the cutter head 18 moves more proximate to the ground surface and is tilted more severely toward the ground surface, while the reel fingers 66 will be rotated toward a more vertical orientation as the cutter head 18 moves more distal from the ground surface and is tilted more away from the ground surface toward a level/horizontal position.

In another implementation, the posture of the cutter head 18 above the ground may also be determined by the controller 46 responsive to inputs received thereby from the input device 44. The operator may provide commands to the input device 44 regarding adjustments to cutter head posture and/or a designated posture at which the cutter head 18 is to operate, with these commands then being converted to input signals and provided to the processor 46a of the controller 46. FIG. 4 illustrates one embodiment of an input device 44 by which an operator may interact to provide commands. As shown therein, the input device 44 may include a joystick 90 and/or up-down arrows 92 by which the operator may manually adjust the height and/or tilt of the cutter head 18. The input device 44 may also include a plurality of "quick command" buttons 94, 96, 98 by which the operator may set the cutter head 18 at one of a number of pre-defined operating set-points each having a pre-defined height of the cutter head 18 off the ground surface and a pre-defined angle of the cutter head 18 relative to the ground surface.

In one implementation where operator inputs are entered, the operator manually adjusts the height and/or tilt of the cutter head 18 via the joystick 90 or up-down arrows 92. In such an occurrence, operator interactions with the joystick 90 or up-down arrows 92 cause commands to be provided to various actuators 70, 74 (via controller 46) to adjust the posture of the cutter head 18. In such an embodiment, sensor inputs from the arrangement of one or more sensors 80, 82, 84, 86 may be provided to the controller 46 responsive to the operator commands entered via the input device 44 (joystick 90 or up-down arrows 92) to determine the adjusted posture of the cutter head 18—with the input and analysis of these sensor inputs being provided and analyzed as previously described. The processor 46a may then access the memory 46b to identify an optimal pitch for the reel fingers 66 (i.e., that provides for desired engagement of the fingers 66 with the crop 20 to prepare the crop for cutting) that corresponds to the adjusted cutter head posture and generate command signals for the finger actuator 78 that cause the finger actuator 78 to rotate the reel fingers 66 to the identified pitch.

In another implementation where operator inputs are entered, the operator adjusts the height and/or tilt of the cutter head 18 via one of the quick command buttons 94, 96, 98 of the input device 44. In the illustrated embodiment, three (3) quick command buttons 94, 96, 98 are provided—with a first button 94 being associated with a non-cutting operating set-point for the cutter head 18, a second button 96 being associated with a standing crop cutting operating set-point for the cutter head 18, and a third button 98 being associated with a flat crop cutting operating set-point for the cutter head 18. Each of the non-cutting operating set-point, the standing crop cutting operating set-point, and the flat crop cutting operating set-point has a pre-defined cutter head height and cutter head angle/tilt associated therewith and, in one embodiment, may also have pre-defined settings for the horizontal/vertical position of the reel 52 and the rotary speed of the reel 52 (or the ratio between the reel speed and the forward speed of the harvesting machine 10).

The quick command buttons 94, 96, 98 provide a "resume" feature for the harvesting machine 10 whereby the operator may quickly and efficiently change posture of the cutter head 18 back and forth between a number of pre-determined positions when harvesting crop, as may be required to account for various locations of the machine along a harvesting route (i.e., cutting within a row of crops or moving between rows of crops while not cutting) and conditions of the crop in the field (i.e., standing or downed, for example). The resume capabilities provided by the quick command buttons 94, 96, 98 thus eliminate the need for the operator to manually adjust the cutter head posture (such as via the joystick 90 or up-down arrows 92) numerous times during crop harvesting, which could otherwise lead to inconsistencies in the cutter head posture and/or increase the operational demands on the operator.

Where the operator selects one of the quick command operating set-points via buttons 94, 96, 98, a corresponding input signal is provided to the processor 46a responsive thereto that is indicative of the quick command. The processor 46a thereafter accesses the memory 46b, which includes stored thereon optimal pitch values for the reel fingers 66 (i.e., that provides for desired engagement of the fingers 66 with the crop to prepare the crop for cutting) for each of the quick commands and the combination of cutter head height and tilt that correspond to that quick command. The processor 46a and memory 46b thus function to identify the optimal pitch for the reel fingers 66 that corresponds to the selected quick command cutter head posture and, responsive thereto, the processor 46a generates command signals for the finger actuator 78 that cause the finger actuator 78 to rotate the reel fingers 66 to the identified pitch.

In still another implementation, it is recognized that the input device 44 may also be used to override an automatically determined reel finger pitch determined and implemented by the controller 46. A pitch adjustment control 100, indicated as up-down arrows in FIG. 4, may be used to adjust a pitch of the reel fingers 66 from that automatically set by the controller 46 based on the current posture of the cutter head 18. As an example, an operator may initially select a quick command set-point (e.g., press one of buttons 94, 96, 98) during operation of the harvesting machine 10, which causes the cutter head 18 to be set at a pre-defined cutter head height and tilt for that quick command set-point and causes the reel fingers 66 to be rotated to an optimal pitch (via finger pitch actuator 78) associated with that pre-defined cutter head height and tilt. Thereafter, the operator may override the automatically set reel finger pitch via interaction with the pitch adjustment control 100—with the operator able to increase or decrease the pitch of the reel fingers 66 as necessary using the override capability provided by the user input 44.

Beneficially, embodiments of the invention thus provide a harvesting machine, and control system therefore, that can automatically adjust orientation of reel fingers in a cutter head based on a posture of the cutter head. The height of the cutter head off the ground surface and/or the angle of the cutter head relative to the ground surface may be determined or set during operation of the harvesting machine, with adjustments to the reel finger pitch made according thereto to position the reel fingers at a more aggressive pitch or less aggressive pitch based on the cutter head height and cutter head tilt. The harvesting machine may therefore be operated in a manner that serves to provide an optimum cut for the crop and provide a desired amount of crop for harvesting, with the reel finger orientation correlated with the cutter head height and angle to provide for proper engagement of the fingers with the crop and prepare the crop for cutting. Quick commands may be utilized in the harvesting machine to provide a "resume" feature whereby the operator may quickly and efficiently change posture of the cutter head back and forth between a number of pre-determined positions, and the reel fingers may be automatically rotated to an optimal pitch that is associated with each of the quick commands.

ENUMERATED EXAMPLES

The following examples of a harvesting machine are further provided and numbered for ease of reference.

1. A harvesting machine includes a cutter head having a cutter bar for cutting crop from a ground surface and a reel located above the cutter bar and being rotatable about an axis of rotation, the reel comprising a plurality of reel arms each having a plurality of fingers thereon to engage the crop. The cutter head also has an actuator configured to adjust a pitch of the plurality of fingers with respect to the reel arms. A controller of the harvesting machine is operably connected with the cutter head. The controller is configured to receive an input on a posture of the cutter head relative to the ground surface, with the input on the posture of the cutter head including one or more of a height of the cutter head off the ground surface or an angle of the cutter head relative to the ground surface. The controller is also configured to operate the actuator to automatically control the pitch of the plurality of fingers based on the received input on the posture of the cutter head.

2. The harvesting machine of example 1, wherein the controller is configured to operate the actuator to rotate the plurality of fingers toward a more horizontal orientation as the cutter head moves more proximate to the ground surface and operate the actuator to rotate the plurality of fingers toward a more vertical orientation as the cutter head moves more distal from the ground surface.

3. The harvesting machine of example 2, wherein in rotating the plurality of fingers toward a more horizontal orientation, the actuator rotates the plurality of fingers in a counterclockwise direction, so that the plurality of fingers point in a more rearward facing direction relative to a direction of travel of the harvesting machine.

4. The harvesting machine of example 1, wherein the controller is configured to operate the actuator to rotate the plurality of fingers toward a more horizontal orientation as the cutter head tilts forward toward the ground surface and operate the actuator to rotate the plurality of fingers toward a more vertical orientation as the cutter head tilts backward toward a more level orientation or away from the ground surface.

5. The harvesting machine of example 1, wherein the input comprises sensor readings of one or more of the height of the cutter head off the ground surface and the angle of the cutter head relative to the ground surface.

6. The harvesting machine of example 5, wherein the sensor readings comprise at least one of a feederhouse position and angle relative to the ground surface, a cutter bar position and angle relative to the ground surface, or a faceplate position and angle relative to the ground surface.

7. The harvesting machine of example 1, wherein the input comprises an operator input to set the cutter head at an indicated cutter head height and cutter head angle.

8. The harvesting machine of example 7, wherein the operator input comprises a quick command corresponding to one of a number of pre-defined operating set-points of the cutter head each having a pre-defined height of the cutter head off the ground surface and a pre-defined angle of the cutter head relative to the ground surface.

9. The harvesting machine of example 8, wherein the number of pre-defined operating set-points selectable via a quick command comprise a non-cutting operating set-point, a standing crop cutting operating set-point, and a flat crop cutting operating set-point, and wherein the pitch of the plurality of fingers moves sequentially more toward a horizontal orientation for the flat crop cutting operating set-point, as compared to the standing crop cutting operating set-point, and as compared to the non-cutting operating set-point.

10. The harvesting machine of example 7, comprising a cutter head actuator configured to adjust the cutter head height and the cutter head angle, and wherein the controller operates the cutter head actuator responsive to the operator input, such that both the pitch of the plurality of fingers and the cutter head height and cutter head angle are adjusted responsive to the operator input.

11. The harvesting machine of example 1, further comprising an input device operably connected to the actuator and able to receive commands from an operator, the input device configured to receive commands from the operator and, responsive to the commands, provide override instructions to the controller to operate the actuator to further adjust the pitch of the plurality of fingers.

12. A control system for controlling pitch of a plurality of reel fingers in a cutter head of a harvesting machine is provided, where the cutter head includes a cutter bar for cutting crop and a reel for engaging the crop and transporting it rearward, the reel comprising a plurality of reel arms on which the plurality of reel fingers are located. The control system includes an actuator operably connected to the reel to adjust a pitch of the plurality of reel fingers relative to a ground surface and a controller operably connected to the actuator. The controller is configured to receive an input on a posture of the cutter head relative to the ground surface, the input on the posture of the cutter head including one or more of a height of the cutter head off the ground surface and an angle of the cutter head relative to the ground surface. The controller is also configured to operate the actuator to automatically control the pitch of the plurality of reel fingers based on the received input on the posture of the cutter head. The actuator is operated to rotate the plurality of reel fingers toward a more horizontal orientation as the cutter head moves closer to the ground surface and toward a more vertical orientation as the cutter head moves further from the ground surface, and is operated to rotate the plurality of reel fingers toward the more horizontal orientation as the cutter head tilts forward toward the ground surface and toward a more vertical orientation as the cutter head tilts backward away from the ground surface 13. The control system of example 12, wherein the input comprises sensor readings of one or more of the height of the cutter head off the ground surface and the angle of the cutter head relative to the ground surface.

14. The control system of example 12, wherein the input comprises an operator input to set the cutter head at an indicated cutter head height and cutter head angle.

15. The control system of example 14, wherein the operator input comprises a quick command corresponding to one of a number of pre-defined operating set-points of the cutter head each having a pre-defined height of the cutter head off the ground surface and a pre-defined angle of the cutter head relative to the ground surface.

CONCLUSION

There has been provided a harvesting machine that includes a cutter head having a reel with reel fingers thereon, where a pitch of the reel fingers may be automatically adjusted based on a posture of the cutter head. An actuator is provided in the cutter head that is configured to adjust a pitch of the plurality of fingers responsive to commands from a controller of the harvesting machine. The controller is configured to receive an input on the posture of the cutter head relative to the ground surface and operate the actuator to automatically control the pitch of the plurality of fingers based on the received input on the posture of the cutter head. The harvesting machine may therefore be operated in a manner that serves to provide an optimum cut for the crop and provide a desired amount of crop for harvesting, with the reel finger orientation being correlated with the cutter bar height and angle to provide for proper engagement of the fingers with the crop and prepare the crop for cutting.

Finally, as used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A harvesting machine, comprising:
    a cutter head including:
        a cutter bar for cutting crop from a ground surface;
        a reel located above the cutter bar and being rotatable about an axis of rotation, the reel comprising a plurality of reel arms each having a plurality of fingers thereon to engage the crop; and
        an actuator configured to adjust a pitch of the plurality of fingers with respect to the reel arms; and
    a controller operably connected with the cutter head, the controller configured to:
        receive an input on a posture of the cutter head relative to the ground surface, the input on the posture of the cutter head including an angle of the cutter bar relative to the ground surface; and
        operate the actuator to automatically control the pitch of the plurality of fingers based on the received input on the posture of the cutter head to rotate the plurality of fingers toward a more horizontal orientation as the cutter bar tilts forward toward the ground surface and to rotate the plurality of fingers toward a more vertical orientation as the cutter bar tilts backward away from the ground surface.

2. The harvesting machine of claim 1, wherein the controller is configured to:
    operate the actuator to rotate the plurality of fingers toward a more horizontal orientation as the cutter head moves more proximate to the ground surface; and
    operate the actuator to rotate the plurality of fingers toward a more vertical orientation as the cutter head moves more distal from the ground surface.

3. The harvesting machine of claim 2, wherein in rotating the plurality of fingers toward the more horizontal orientation, the actuator rotates the plurality of fingers in a counterclockwise direction, so that the plurality of fingers point in a more rearward facing direction relative to a direction of travel of the harvesting machine.

4. The harvesting machine of claim 1, wherein the input comprises sensor readings of one or more of the height of the cutter head off the ground surface and the angle of the cutter bar relative to the ground surface.

5. The harvesting machine of claim 4, wherein the sensor readings comprise at least one of a feederhouse position and angle relative to the ground surface, a cutter bar position and the angle of the cutter bar relative to the ground surface, or a cutter head frame position and angle relative to the ground surface.

6. The harvesting machine of claim 1, wherein the input comprises an operator input, entered via an input device, that sets the cutter head at an indicated cutter head height and cutter bar angle.

7. The harvesting machine of claim 6, wherein the operator input comprises a quick command corresponding to one of a number of pre-defined operating set-points of the cutter head each having a pre-defined height of the cutter head off the ground surface and a pre-defined angle of the cutter bar relative to the ground surface.

8. The harvesting machine of claim 7, wherein the number of pre-defined operating set-points selectable via a quick command comprise a non-cutting operating set-point, a standing crop cutting operating set-point, and a flat crop cutting operating set-point, and wherein the pitch of the plurality of fingers moves sequentially more toward a horizontal orientation for the flat crop cutting operating set-point, as compared to the standing crop cutting operating set-point, and as compared to the non-cutting operating set-point.

9. The harvesting machine of claim 6, comprising one or more cutter head actuators configured to adjust the cutter head height and the cutter bar angle, and wherein the controller operates the one or more cutter head actuators responsive to the operator input, such that both the pitch of the plurality of fingers and the cutter head height and cutter bar angle are adjusted responsive to the operator input.

10. The harvesting machine of claim 1, wherein the actuator comprises one of an electric actuator, a hydraulic actuator, or a pneumatic actuator.

11. The harvesting machine of claim 1, further comprising an input device operably connected to the actuator and able to receive commands from an operator, the input device configured to:
    receive commands from the operator; and responsive to the commands, provide override instructions to the controller to operate the actuator to further adjust the pitch of the plurality of fingers.

12. A control system for controlling pitch of a plurality of reel fingers in a cutter head of a harvesting machine, the cutter head including a cutter bar for cutting crop and a reel for engaging the crop and transporting it rearward, the reel comprising a plurality of reel arms on which the plurality of reel fingers are located, wherein the control system comprises:

an actuator operably connected to the reel to adjust a pitch of the plurality of reel fingers relative to a ground surface; and a controller operably connected to the actuator, the controller configured to:

receive an input on a posture of the cutter head relative to the ground surface, the input on the posture of the cutter head including an angle of the cutter bar relative to the ground surface; and operate the actuator to automatically control the pitch of the plurality of reel fingers based on the received input on the posture of the cutter head;

wherein the actuator is operated to rotate the plurality of reel fingers toward the more horizontal orientation as the cutter bar tilts forward toward the ground surface and toward a more vertical orientation as the cutter bar tilts backward away from the ground surface.

13. The control system of claim 12, wherein in rotating the plurality of reel fingers toward a more horizontal orientation, the actuator rotates the plurality of reel fingers in a counterclockwise direction, so that the plurality of reel fingers point in a more rearward facing direction relative to a direction of travel of the harvesting machine.

14. The control system of claim 12, wherein the input comprises sensor readings of one or more of the height of the cutter head off the ground surface and the angle of the cutter bar relative to the ground surface.

15. The control system of claim 14, wherein the sensor readings comprise at least one of a feederhouse position and angle relative to the ground surface, a cutter bar position and the angle of the cutter bar relative to the ground surface, or a cutter head frame position and angle relative to the ground surface.

16. The control system of claim 14, further comprising a ground following feeler configured to provide the sensor readings of the height of the cutter head off the ground surface.

17. The control system of claim 12, wherein the input comprises an operator input to set the cutter head at an indicated cutter head height and cutter bar angle.

18. The control system of claim 17, wherein the operator input comprises a quick command corresponding to one of a number of pre-defined operating set-points of the cutter head each having a pre-defined height of the cutter head off the ground surface and a pre-defined angle of the cutter bar relative to the ground surface.

19. The control system of claim 12, wherein the controller is further configured to receive override instructions from an operator and, responsive thereto, operate the actuator to further adjust the pitch of the plurality of reel fingers.

* * * * *